May 10, 1966  M. MOLLICK  3,250,292
GAUGE
Filed March 18, 1964
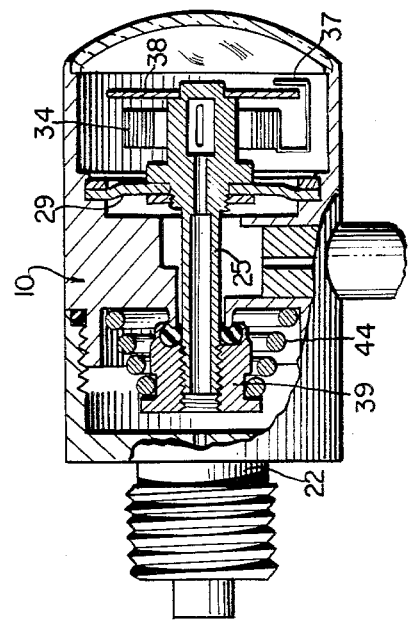
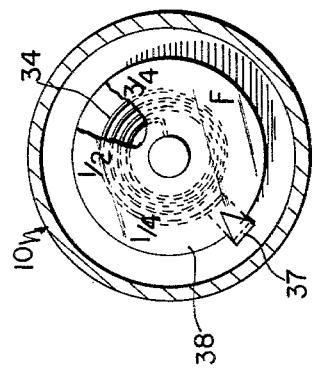
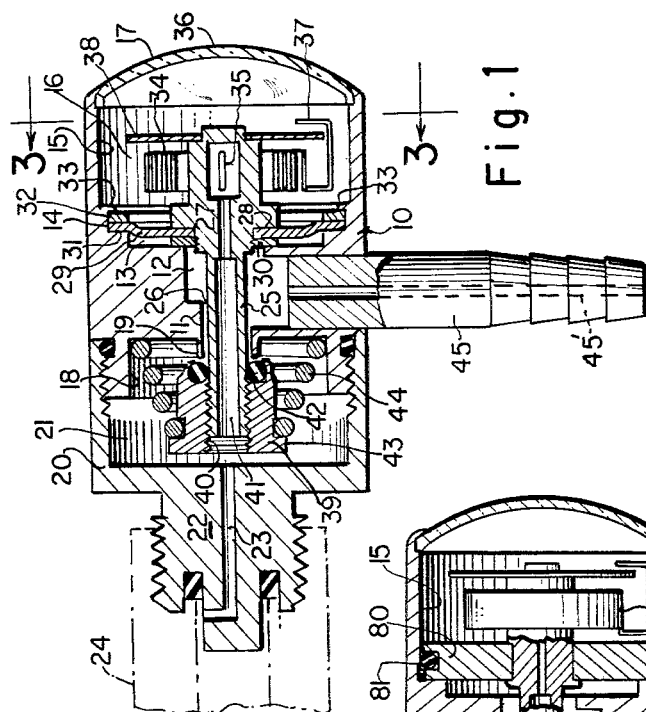
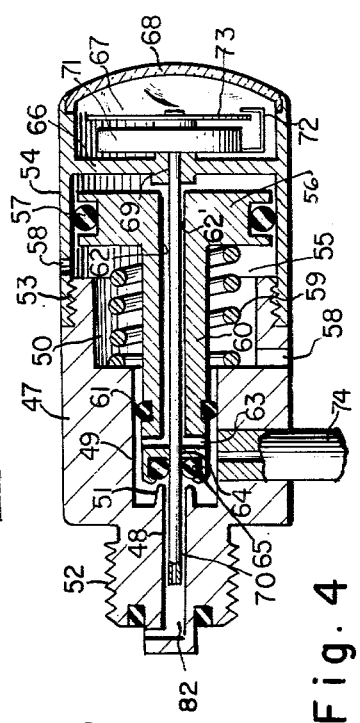
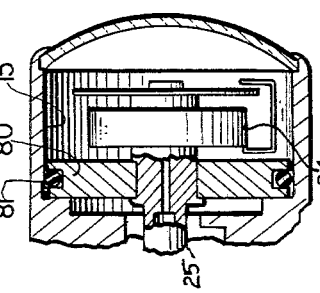
INVENTOR
*MILTON MOLLICK*
BY
*Robertson, Smythe & Bryan*
ATTORNEYS

United States Patent Office 3,250,292
Patented May 10, 1966

3,250,292
GAUGE
Milton Mollick, Allentown, Pa., assignor to Ametek, Inc., New York, N.Y., a corporation of Delaware
Filed Mar. 18, 1964, Ser. No. 352,795
4 Claims. (Cl. 137—505.28)

This invention relates to combined gas regulator and gauge assemblies, and particularly to an improved regulator and gauge for supplying oxygen for use by an individual.

It is desirable to be able to ascertain while using $O_2$ the amount remaining and to provide such information in a compact assembly. In present devices, the gauge is a separate unit or accessory.

The principal object of the invention is to provide a combined regulator and gauge in which high pressure oxygen contained within a pressure vessel can be supplied at a predetermined rate and at a reduced pressure for inhaling by an individual.

In one aspect of the invention, the combined regulator and gauge for gas, such as oxygen and the like, may comprise a body portion including a chamber at one end for the reception of gauging means such as a Bourdon tube or the like. The opposite end of the body portion may be threaded to receive a cap forming another chamber adapted to contain the pressure regulator mechanism. Between the two chambers the body portion may include a recess forming a third chamber that communicates with the regulator mechanism chamber by a thin annular passage surrounding the hollow tubular member. This third chamber is separated from the gauge mechanism chamber by a flexible diaphragm through which the tubular member passes and to which said tubular member is securely fastened.

In another aspect of the invention, the end of the tubular member within the gauge chamber supports a Bourdon tube type of gauge and a dial therefor.

In still another aspect of the invention, the end of the tubular member opposite that connected to the diaphragm may support an axially adjustable valve seat that cooperates with a mating seat formed at the entrance to the annular passage from the regulator mechanism chamber.

In still another aspect of the invention, the adjustable valve seat may embody an O-ring which during regulation provides the necessary pressure reduction, but during off-normal condition (such as an accidental blockage in the gas exit) will provide a dead tight shutoff, avoiding damage to the diaphragm.

In still another aspect of the invention, a spring may be located within the regulator mechanism chamber for normally urging the two valve seats apart, the force of said spring being adjustable to vary the pressure of the gas within the intermediate chamber; and an outlet may be connected to the body portion leading from the intermediate chamber.

From the foregoing it is evident that the tubular member is floating supported within the body portion at one end by the diaphragm and at the other end by the spring within the regulator mechanism chamber.

In another aspect of the invention, the diaphragm may be omitted and a piston having differential areas may be employed to effect the closing of the valve seats.

The above, other objects and novel features of the invention will become apparent from the following specification and accompanying drawing which is merely exemplary.

In the drawing:

FIG. 1 is a sectional view of a combined gas regulator and gauge to which the principles of the invention have been applied;

FIG. 2 is a view similar to FIG. 1 showing the valve closed, whereas in FIG. 1 it is shown as open;

FIG. 3 is a sectional view taken substantially along line 3—3 of FIG. 1;

FIG. 4 is a view similar to FIG. 1 showing a modified form of the invention; and FIG. 5 is a fragmentary sectional view of another form.

Referring to the drawing, and particularly to FIGS. 1, 2 and 3, the principles of the invention are shown as applied to a combined regulator and gauge comprising a body portion 10 which is depicted as cylindrical in form. The body portion 10 may include an axial bore 11 extending therethrough and counterbores 12, 13, 14 and 15 forming concentric stepped shoulders therebetween. The counterbore 15 is relatively long, forming a chamber 16 that is closed by a transparent crystal 17.

The opposite end of body 10 is provided with a counterbore 18 that forms a valve seat 19 for a purpose to be described later. The outer periphery of body 10 is provided with threads adapted to receive an internally threaded cap 20 forming a chamber 21 within which the regulating mechanism is mounted. The cap 20 may also include an externally threaded portion 22 having a central passage 23 therethrough. The portion 22 is adapted to be connected by a fitting 24 to a source of oxygen or other gas under a pressure in excess of that capable of being used.

An axially movable, non-rotatable tubular member 25 is mounted within bore 11. The diameter of that portion of member 25 that passes through bore 11 is such that an annular passage 26 is formed between member 25 and bore 11.

The tubular member 25 may be screwed into or suitably formed to a gauge mount 27 having a shoulder 28, and a flexible diaphragm 29 is held between shoulder 28 and a collar 30 that is fixed to enlarged portion 27 by screw threads or the like. The outer peripheral edge of the diaphragm 29 may be rigidly held against a shoulder 31 formed by counterbore 14, by a collar 32 that is fixed to the body 10 within counterbore 14 by a peened over edge 33.

The righthand end of gauge mount 27 (FIG. 1) may support the coil of a spiral Bourdon tube 34 having communication with the interior of members 27 and 25 through a port 35. The free end of tube 34 may support a pointer 37 that cooperates with a dial 38 fixed to the non-rotatable member 25. A window 36 is provided.

The opposite end of tubular member 25 may threadingly support for axial adjustment a gland 39 having a passage 40 that is aligned with and communicates with the axial passage 41 of tubular member 25. The face of gland 39 adjacent seat 19 includes a seat 42, which is preferably an elastomeric O-ring adapted to cooperate with seat 19 as will be explained later.

The gland 39 includes a flange 43 between which and body 10, a compression spring 44 is located for normally urging the seats 42 and 19 apart. The intermediate chamber 12 may be provided with an outlet nipple 45 leading to the point of use of the gas.

The dial 38 is calibrated to indicate the amount of gas within the pressure supply vessel. With the parts in the condition shown in FIG. 1, the high pressure gas passes through passage 41 constantly acting on the Bourdon tube 34. With seats 19 and 42 separated, the high pressure gas passes through the annular passage 26 to an intermediate chamber between valve seat 19 and diaphragm 29 and acts on diaphragm 29 causing it to move rightwardly, drawing with it tubular member 25 and gauge mount 27 until seat 42 abuts seat 19 (FIG. 2), cutting off communication between passage 23, chamber 21 and annular passage 26. When the user withdraws the oxygen or gas from chamber 12 through outlet 45, the spring 44 moves member 25 and diaphragm 29 leftwardly, thereby separating seats 19 and 42. Movement of seats 19 and 42 toward and from each other actually provides an opening creating an equilibrium condition between the force of spring 44 and the pressure force on diaphragm 29, so as to maintain a supply of gas within chamber 12 at a pressure substantially less than that in the pressure supply vessel, while still constantly indicating on dial 38 the remaining gas within the supply vessel. The pressure at which the regulators settles at equilibrium condition is such as to provide a desired flow rate through the orifice in outlet 45 past the restriction 45' therein.

Referring to FIG. 4, the principles of the invention are shown as applied to a combined regulator and gauge including a body 47 having a bore 48 and counterbores 49 and 50. The counterbore 49 terminates in a seat 51. Each end of body 47 is threaded at 52 and 53. A cap 54 is adapted to be threaded onto threads 53 forming with counterbore 50 a chamber 55 within which a piston 56 is adapted to reciprocate as will be explained.

The piston 56 includes a piston ring seal 57 so that gas under pressure on its righthand face cannot leak past the piston. Ports 58 lead to atmosphere to permit movement of piston 56 leftwardly, and a spring 59 between piston 56 and the bottom of counterbore 50 urges piston 56 rightwardly.

The piston 56 includes a piston rod 60 that extends into counterbore 49 and carries a seal such as an O-ring 61 between it and the surface of counterbore 49. The rod 60 includes an axial passage 62 extending from the righthand face of piston 56 and terminating in passages 63 extending radially through the wall of rod 60. An axial passage 64 of less diameter than that of passage 62 extends from radial passages 63 to the lefthand end of rod 60, which end is provided with a valve seating element 65 adapted to cooperate with seat 51 at the end of counterbore 49 when piston 56 is moved leftwardly.

The cap 54 may include a partition 66 forming a chamber 67 that is closed by a transparent crystal 68. This partition may include an axial passage 69 adapted fixedly to receive an elongated tube 70 that extends from within chamber 67 through passage 62 into the threaded end 52 of body 47. The diameter of the tube 70 and passage 62 is such that an annular space 62' is formed between the two. Also, the diameter of tube 70 and O-ring 65 is such that a sliding sealing engagement between the two is provided.

The end of the tube 70 within chamber 67 is connected in communicating relation with the interior of a Bourdon tube 71 having a pointer 72 fixed to its free end that cooperates with a fixed dial 73.

An outlet tube 74 extends from the counterbore 49 for supplying oxygen or other gas at a predetermined flow rate through the orifice in tube 74 and past an orifice restriction therein, for the purpose intended when the threaded end 52 is connected to a high pressure source vessel. Continuous indication of the quantity of gas within the high pressure vessel is shown by the dial 73 and pointer 72.

With the apparatus in the condition shown in FIG. 4, high pressure gas enters passage 82, passing into counterbore 49, through radial passages 63, thence through annular passage 62', into cap 54 on the right side of piston 56 and the left side of partition 66, forcing piston 56 leftwardly against the action of spring 59, thus forcing seats 51 and 65 together, shutting off the supply from the high pressure source. Consumption of the gas within the bore 49 through outlet 74 and the reduction therein reduces the pressure so that spring 59 returns piston 56, separating seats 51 and 65, thus establishing equilibrium flow.

The pressure within counterbore 49 may be changed for given uses, by employing a spring 59 of a predetermined strength.

In FIG. 5, parts similar to FIG. 1 are given the same reference numerals. In place of the diaphragm 29 of FIG. 1 a piston 80 (FIG. 5) can be employed such having O-ring 81 contacting walls 15 of chamber 16.

Although the various features of the improved combined regulator and gauge have been shown and described in detail to fully disclose two embodiments of the invention, it will be evident that changes may be made in such details and certain features may be used without others without departing from the principles of the invention.

What is claimed is:

1. In a combined gas regulator and indicating gauge, the combination comprising first and second end chambers and an intermediate chamber in communication and axial alignment; a tubular member extending through the three chambers and establishing communication solely between said end chambers; pressure indicating means in said second end chamber mounted on said tubular member to indicate pressure therewithin; means providing an inlet to said first end chamber; valve means associated with said member to control communication between said first and intermediate chambers; resilient means biasing said valve means open; pressure responsive means operatively connected to said valve means and positioned between said second and intermediate chambers and responsive to pressure therein for controlling said valve means; and outlet means connected to said intermediate chamber.

2. A combined gas regulator and indicating gauge as claimed in claim 1, in which said pressure responsive means comprises a diaphragm, to which said tubular member is connected.

3. A combined gas regulator and indicating gauge as claimed in claim 1, in which said pressure responsive means within said intermediate chamber comprises a piston.

4. A combined gas regulator and indicating gauge as claimed in claim 1, in which said operative connection between said pressure responsive means and said valve comprises a second tubular member.

References Cited by the Examiner

UNITED STATES PATENTS

| 1,491,192 | 4/1924 | Burdett | 137—505.44 |
| 2,855,950 | 10/1958 | Phillips | 137—505.28 |
| 3,004,686 | 10/1961 | McKee | 137—505.28 X |
| 3,134,400 | 5/1964 | Schifter | 137—505.39 X |

FOREIGN PATENTS

| 1,145,866 | 5/1957 | France. |

ISADOR WEIL, *Primary Examiner.*

H. WEAKLEY, *Assistant Examiner.*